United States Patent [19]

Jacobson et al.

[11] Patent Number: 4,777,798

[45] Date of Patent: Oct. 18, 1988

[54] UNIVERSAL CONTROL SYSTEM FOR HYDRAULIC CYLINDERS

[75] Inventors: Kenneth E. Jacobson; Stanley R. Norland; James C. Solie, all of Owatonna, Minn.

[73] Assignee: Owatonna Tool Company, Owatonna, Minn.

[21] Appl. No.: 99,093

[22] Filed: Sep. 21, 1987

[51] Int. Cl.⁴ .............................................. F16D 31/02

[52] U.S. Cl. ........................................ 60/428; 60/327; 91/1; 91/171; 91/362

[58] Field of Search ..................... 60/428; 91/361, 362, 91/363 R, 170 R, 170 MP, 171, 1; 250/237 G; 92/5 R

[56] References Cited

U.S. PATENT DOCUMENTS

| | | | |
|---|---|---|---|
| 000,000H277 | 5/1987 | Lee et al. | 250/237 G |
| 3,377,924 | 4/1968 | Spencer et al. | 91/171 |
| 3,427,463 | 2/1969 | Weyrauch | 250/237 G |
| 3,638,535 | 2/1972 | Porter | 91/171 |
| 3,691,911 | 9/1972 | Visser | 91/412 |
| 3,968,730 | 7/1976 | Lionet | 91/171 |
| 4,369,366 | 1/1983 | Schmitt | 250/237 G |
| 4,518,285 | 5/1985 | Weber et al. | 91/170 MP |
| 4,554,451 | 11/1985 | Kirstein | 250/237 G |
| 4,679,489 | 2/1987 | Jasinski et al. | 91/171 X |

OTHER PUBLICATIONS

A publication of Applied Power Inc., copyright 5/1985, Enerpac, *The Lift System: Strand Lift.*

*Primary Examiner*—Edward K. Look

*Attorney, Agent, or Firm*—Wood, Dalton, Phillips, Mason & Rowe

[57] ABSTRACT

A universal control system for hydraulic cylinders to enable controlled increments of movement for varying uses including shaping members and lifting and lowering of loads. The lift control system is utilized to synchronize the raising or lowering of a load by, for example, four simultaneously-acting pump-operated hydraulic rams which have plural increments of movement. A sensor associated with the load adjacent each ram measures incremental movement of the load. A master controller controls the operation of the rams in accordance with the sensed increments and operates each pump simultaneously and independently until each pump achieves a preselected increment of movement of a ram, to maintain the load substantially level, followed by movement of all the rams through another increment of movement until the total lifting or lowering movement is achieved.

23 Claims, 5 Drawing Sheets

UNIVERSAL CONTROL SYSTEM FOR HYDRAULIC CYLINDERS

FIELD OF THE INVENTION

This invention relates generally to control systems for hydraulic cylinders, and more particularly, to a lift control system for providing precise raising and lowering of a load by use of cylinders in the form of double-acting rams.

BACKGROUND OF THE INVENTION

Conventional lift control systems utilize hydraulic pumps and cylinders to lift a load at a plurality of different positions. It is desirable to operate each pump and cylinder so that the load remains level while being raised or lowered. The accuracy of such a system can be affected due to variations in pump flows, cylinder capacities, hose lengths and pump efficiencies, among other factors. A cylinder used in such a system is also referred to as a "ram".

An example of one such lift control system is shown in Lionet U.S. Pat. No. 3,968,730 which discloses a plurality of rams each operated in accordance with a servovalve. A linear variable resistive element associated with each ram provides a position signal. The position signal of pairs of rams are compared to indicate the relative positions of the two rams. The comparison signal is combined with an up or down command to partially open or close a particular servo valve, as required, so that the rams remain synchronized. Such a system is complicated due to the fact that the system must be precisely calibrated in order to accurately convert the resistance value of each resistive element. Moreover, such an apparatus cannot insure that incremental movement of each ram is maintained within a desirable level relative to the others. An added problem is the inability to detect that a ram may have moved downwardly into a support surface when under load.

The present invention is intended to overcome these and other problems associated with control systems for hydraulic cylinders.

SUMMARY OF THE INVENTION

In accordance with the present invention, a control system provides for positively controlled interrelated movement of a plurality of hydraulic elements.

Broadly, there is disclosed herein an apparatus for control of a plurality of actuator elements. The apparatus used as a lift control system includes means mounted independently of the actuator elements for sensing the movement of each actuator element and control means coupled to the actuator element and the sensing means provide a selective plurality of equal and incremental movements of each of said actuator elements responsive to the movement sensed to maintain uniform total movement of the actuator elements.

In the preferred embodiment, the control system is utilized to synchronize the raising or lowering of a load by, for example, four simultaneously acting pump operated hydraulic rams. A sensor is provided for each ram. Each pump and sensor is coupled to a control device which operates the pump in response to input signals provided by the sensors. The sensor provides a digital signal representative of incremental movement of load.

The control system is initiated with each ram at its own lift point in a predetermined position. The pumps are energized simultaneously by a master controller as the control means and each remains energized until an increment signal is received from its associated sensor. The operation continues on a cyclical basis to synchronize the raising or lowering of the load. During each cycle, the fastest acting ram waits for the remaining rams to catch up to have all rams complete the increment of movement. If an incremental signal is not received from one or more rams in a predetermined period of time, the system shuts down. Additionally, if more than one incremental signal is received for a particular lift point in one cycle, then the system is shut down.

It is another object of the present invention to provide a lift control system utilizing sensors independent of the hydraulic rams to provide sensing of incremental movement of the load by the hydraulic rams.

In the preferred embodiment, the sensor includes an infra-red device positioned adjacent a sensor plate in the form of a position grid having uniformly spaced slots and which is flexibly connected to the load. The output signal from the sensor comprises a pulse signal having a pulse present when the sensor is adjacent a slot.

It is yet another object of the present invention to provide a control system having sensors operable to sense the direction of movement of a ram. Two offset sensor devices are provided for each ram. The sequence of the pulses from the two sensors depends on the direction of movement of the ram. Thus, the master controller can assure that the rams are moving in the proper direction.

It is still a further object of the present invention to provide a lift control system which is portable.

The universal control system has particular utility as a lift system as disclosed herein. Standard hydraulic pumps and double-acting rams having differing oil delivery rates and capacities, respectively, can be intermixed to effect precision control over lifting or lowering a load of almost any size, such as a bridge, a building, or a huge forming die. The universal control system has a group of components used to control the hydraulic pumps and rams and which will keep the load level at all lift points, regardless of load weight distribution. A determination is made as to the number of lift points, each requiring a hydraulic pump and a ram, the total distance for the lifting or lowering of the load, the increments of movement based on the selected position grid of a sensing system, and the amount of time allowed for all rams to complete an increment of movement. The foregoing is programmed into a master controller. If, for example, a six-inch lift of the load is desired and the position grid is provided with $\frac{1}{4}$ inch spacing of slots therein there would be a requirement for a total of 24 increments of movement of the rams. All rams must complete their increment of movement before the rams can start the next increment of movement. This assures precise lifting or lowering of the load during the lifting or lowering thereof. Load-lowering valves, in the form of counterbalance valves, are associated with the rams to provide precise control when lowering the load. The direction of movement of a ram is determined by a 4-way manual valve associated with each ram. With the requirement that all rams complete their increment of movement before all the rams start the next increment of movement, the rams do not have to have uniform rates of movement. When a ram has caused movement of a load through the increment for that ram, the pump associated therewith momentarily stops and then starts again when the slowest pump/ram combination has made its increment. In a practical embodiment, lift points can be up to 1,000 feet apart and a substantial number of pumps and rams located at different lift points can be controlled by the master controller with the potential for linking two or more master controllers to have an additional number of lift points.

The universal control system also has utility in control of plural cylinders (rams) which perform other functions, such as bending of plates to a particular contour, as in ship building, wherein the cylinders are individually controlled for both incremental and total movement.

Further features and advantages of the invention will readily be apparent from the specification and from the drawings.

DETAILED DESCRIPTION OF THE PREFERRED EMBODIMENT

Figure 1:
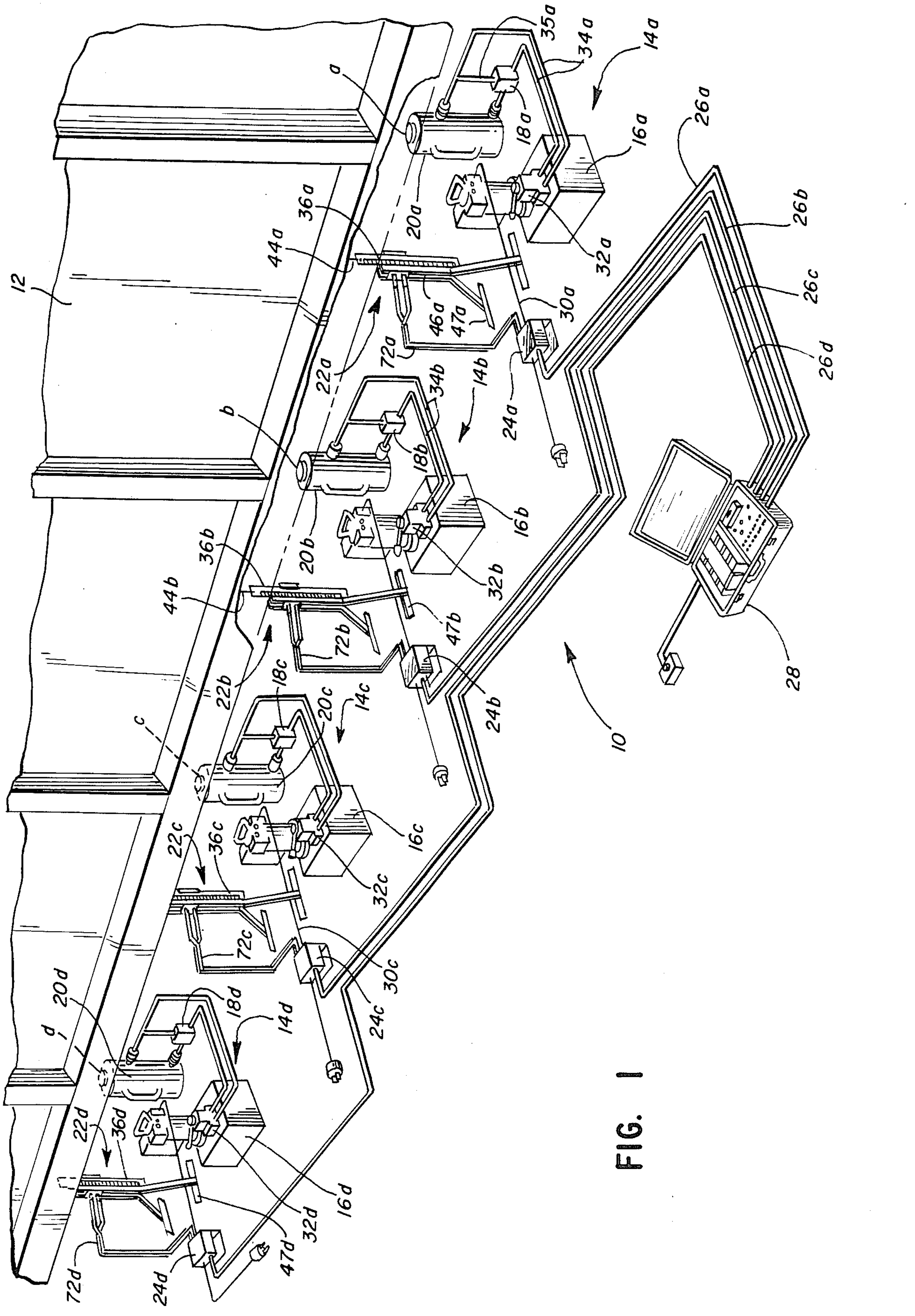
FIG. 1 is a perspective view of a lift control system according to the present invention.

Referring to FIG. 1, a lift control system 10 according to the present invention is illustrated. The lift control system is shown for raising and lowering a load 12. The load 12 may be, for example, a bridge, a house, or any other large load which must be raised and lowered precisely while maintaining the load level or lifting the load equally.

In the illustrated embodiment, the lift control system 10 includes four similar remote lifting component groups **14*a–d*** for lifting the load at four separate lift points a–d, respectively.

As each remote group **14*a–d*** is similar, only one group will be described in detail. Reference numerals are similar for each system with the suffix a, b, c or d indicating to which group a particular component belongs.

While the illustrated embodiment is shown including four lift points, a control system according to the present invention could be provided with as few as two lift points, or with more than fifty lifting points, as necessary, by linking master controllers.

The remote group **14*a* includes a hydraulic pump 16*a*, a load lowering valve 18*a*, a hydraulic ram 20*a*, a sensor system 22*a* and a remote control unit 24*a*. The remote control unit provides the necessary interface with the master controller and has a jog switch to facilitate set-up of a ram. A multiconductor cable 26*a* connects remote control unit 24*a* to a master controller 28. The comparable components of remote group 14*b*, 14*c* and 14*d*** are given the same reference numeral with the suffix of the particular remote group.

While in the preferred embodiment each ram 20 is a double-acting hydraulic ram, alternative controllable hydraulic devices could be substituted therefor. References are made to both cylinders and rams, with a ram typically being a cylinder having a piston movable through a relatively short stroke and capable of exerting tons of force. In the preferred embodiment, each ram has a capacity ranging from 55 to 500 ton lifting capacity. The only requirement is that a ram have a rated capacity greater than the load it will carry. It is not necessary that each of the rams **20*a*–20*d*** be identical.

The pump **16*a* is electrically operated and receives power through a cable 30*a* connecting the pump to the remote control unit 24*a*. The pump is equipped with a four-way manual valve 32*a*. The pump 16*a* must provide sufficient flow and pressure to the ram 20*a* to accomplish the lift within a required time limit. The pump 16*a* must also be capable of starting under full load. Suitable hoses 34*a* connect the pump's manual valve 32*a* with the load lowering valve 18*a* and the ram 20*a***.

The load lowering valve **18*a* has a pilot operated counterbalance valve, piloted through line 35*a*, which provides precise control over the descent of the load. Additionally, the load lowering valve 18*a* holds the load if the hoses between the pump 16*a* and the load lowering valve 18*a*** are cut or leak. A valve usable as the load lowering valve is the load holding valve Model SPV 8.5X3.F-21400 offered by H. Bieri AG of Liebefeld, Switzerland.

Figure 2:
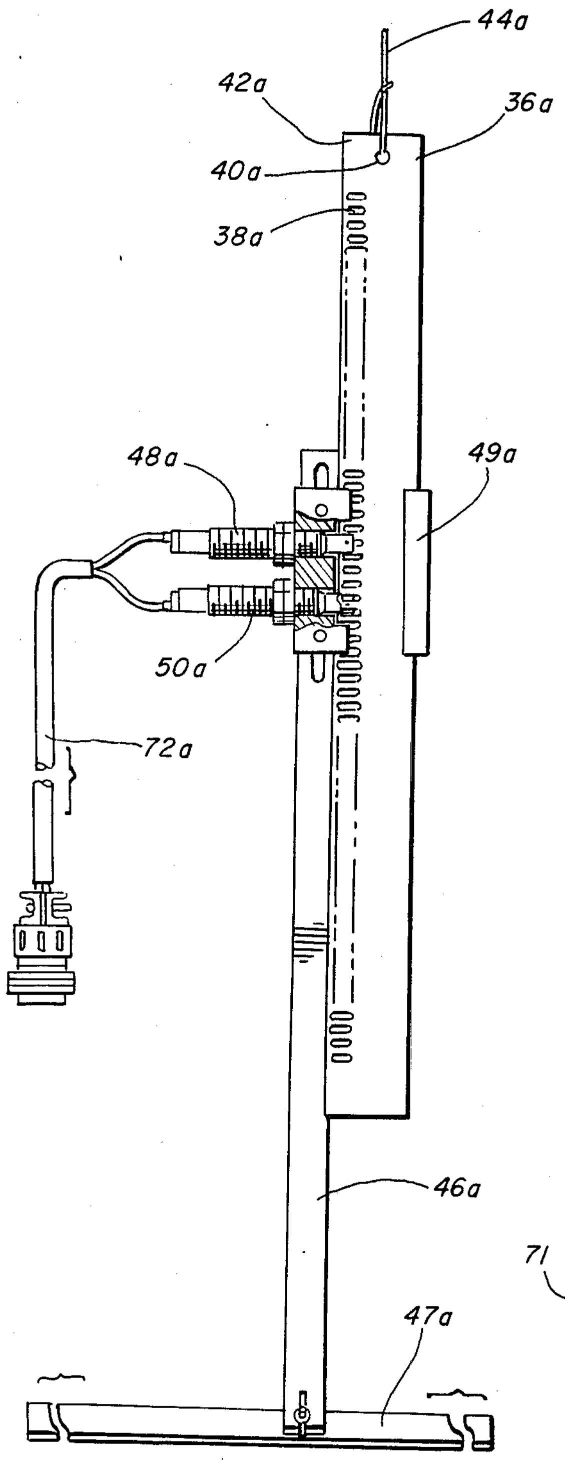
FIG. 2 is an elevational view of a position sensor of the lift control system of FIG. 1.

Referring also to FIG. 2, the sensor system **22*a* includes a position grid in the form of an elongate sensor plate 36*a* of, for example, metal construction, including a plurality of equally longitudinally-spaced slots 38*a*. In the preferred embodiment, the spacing L between the slots is one-quarter inch to insure that the load always remains level, relative to a reference plane, within one-quarter inch, as more fully set forth hereinafter. An aperture 40*a* is provided at an upper end 42*a* of the sensor plate 36*a* for attachment to the load 12. A connecting element 44*a*, such as a string, wire, or other similar device, suspends the sensor plate 36*a* from the load 12**. If a load is to be lifted a total of 4 inches, there would then be 16 increments of movement, with each increment being $\frac{1}{4}$ inch, as more fully described hereinafter.

A support stand **46*a*, supported independently of the hydraulic ram, slidably receives the sensor plate 36*a* for vertical movement. The support stand is supported on a surface unaffected by the loading and has adjustable feet 47*a* to facilitate level mounting of the stand. In this way, true lift motion can be detected. A pair of photo-electric devices in the form of infra-red sensors 48*a* and 50*a* are mounted to the stand 46*a* by a bracket 49*a* which loosely guides the position grid 36*a*. Each sensor 48*a* and 50*a* includes an energy source 48*s* and 50*s*, respectively, and a receiving element 48*r* and 50*r*, respectively. Each sensor 48*a* and 50*a* generates a pulse-type output signal having a high state when a beam generated by the source 48*s* or 50*s* is received by its corresponding receiving element 48*r* or 50*r*, respectively. Accordingly, a low state of the pulse indicates that a solid portion of the sensor plate 36*a* is obstructing passage of the beam, while a high state of the pulse signal indicates the presence of a slot 38*a* between the energy source 48*s* or 50*s* and the receiving element 48*r* or 50*r***, respectively. Alternatively, other types of sensors may be used to generate signals or signals of opposite state.

Figure 2A:
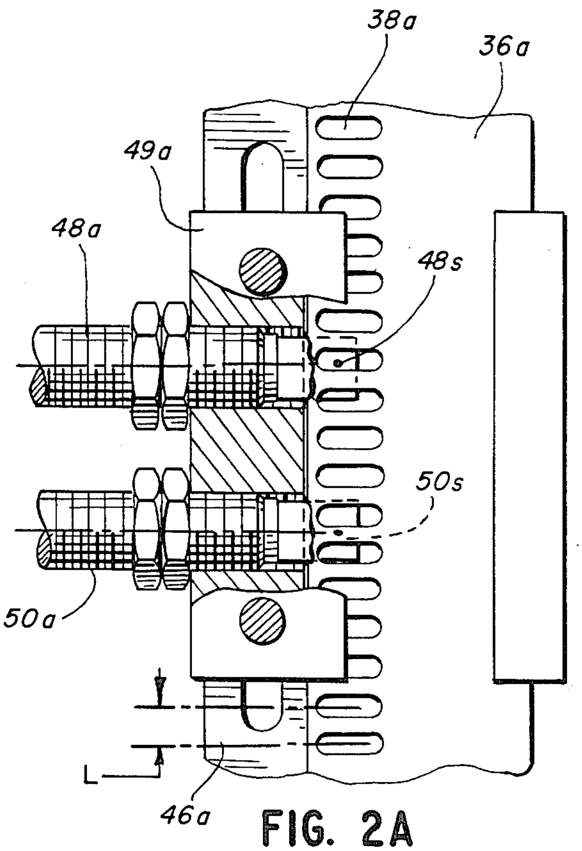
FIG. 2A is an enlarged portion of a part of FIG. 2.

The first sensor **48*a* is utilizd as a primary sensor for sensing incremental movement of the load. The secondary sensor 50*a* is used in conjunction with the primary sensor 48*a* to determine direction of movement of the load. Preferably, the sensors 48*a* and 50*a* are spaced apart by a distance which is a multiple of the slot spacing "L" plus 0.25L (FIG. 2). This is seen in FIG. 2A wherein the beam can pass through a slot 38*a* to the sensor 48*a*** while the other beam is blocked. This offset results in the secondary sensor signal leading or lagging the primary sensor signal by 90°. This 90° offset of pulses, known as quadrature pulses, insures greater accuracy in determining direction of movement, as described more specifically below.

Figure 3:
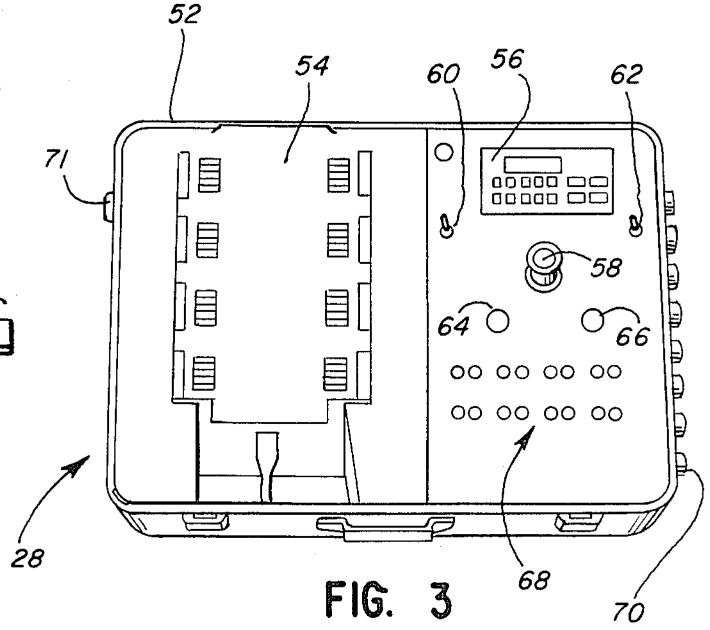
FIG. 3 is a plan view of a master controller of the lift control system of FIG. 1.

Referring to FIG. 3, the master controller 28 is housed in a suitable carrying case 52 for portability thereof. The controller 28 includes a microprocessor base control device 54 as a programmable controller or other similar programmable device. A key-pad and display terminal 56 is provided in the case 52 for enabling an operator to enter lifting parameters into the microprocessor 54. Such parameters include number of lifting points, lifting distance and lift time for one increment as described further below. Also provided in the master controller 28 is a master control switch 58, a pause switch 60, an up/down selector switch 62, start and stop buttons 64 and 66, respectively, and groups of manual pump push button control operators and pilot lights 68. Output ports 70 are provided for plugging in the multiconductor cables 26 coupling the master controller 28 to each remote control unit 24. A switch port 71 provides a connection for a length of cable having an interrupt switch to enable an operator to be at a lift point and interrupt the lift/lower cycle for such time as a switch button is depressed.

The remote control unit **24*a* provides an interface between the master controller 28 and the remote group 14*a*. Particularly, the remote control unit has a conventonal signal-responsive switch to receive signals from the master controller 28 to command the pump to start and stop, in conjunction with the pulse signals generated by the sensor system 22*a*. The sensor system 22*a* is coupled to the remote control unit 24*a* with suitable conductors 72*a***.

In a typical lifting operation, the lift control system 10 is initially set up by placing a ram 20 underneath the load at each lifting point a–d. The four-way manual valves 32 must be appropriately set to direct fluid flow from the pumps 16 to the rams 20 for providing elevation of the rams 20. The manual control button 68 on the master controller 28 for each remote group 14 is depressed to elevate each ram 20 until it engages the load of its associated lifting point. Alternatively, this operation can be carried out by control at the remote control unit 24 by a push button unit (not shown) at each remote control unit 24. In normal operation, each ram **20*a–d* is raised individually to a point where the load is level to some reference plane. Thereafter, the master controller 28 is operable to automatically control elevation and descent of the rams 20*a–d* to raise or lower the load 12** while maintaining it level within one-quarter of an inch relative to its initial reference level.

Figure 6:
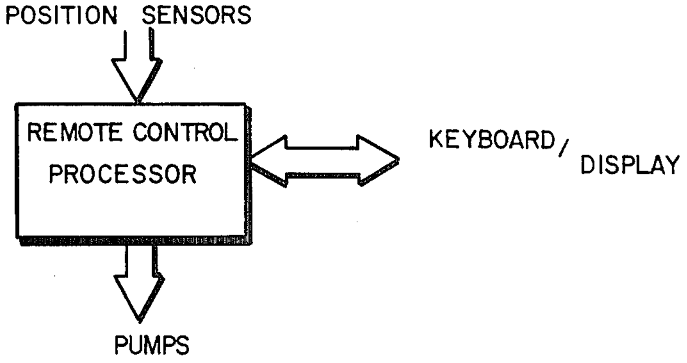
FIG. 6 is a generalized block diagram of the master controller.

The master controller 28 is shown in the block diagram of FIG. 6 as a processor having inputs from the sensors 48 and 50 and outputs to the pumps 16. The processor has manual inputs from and outputs to the key-pad and display terminal 56.

Figure 4A:
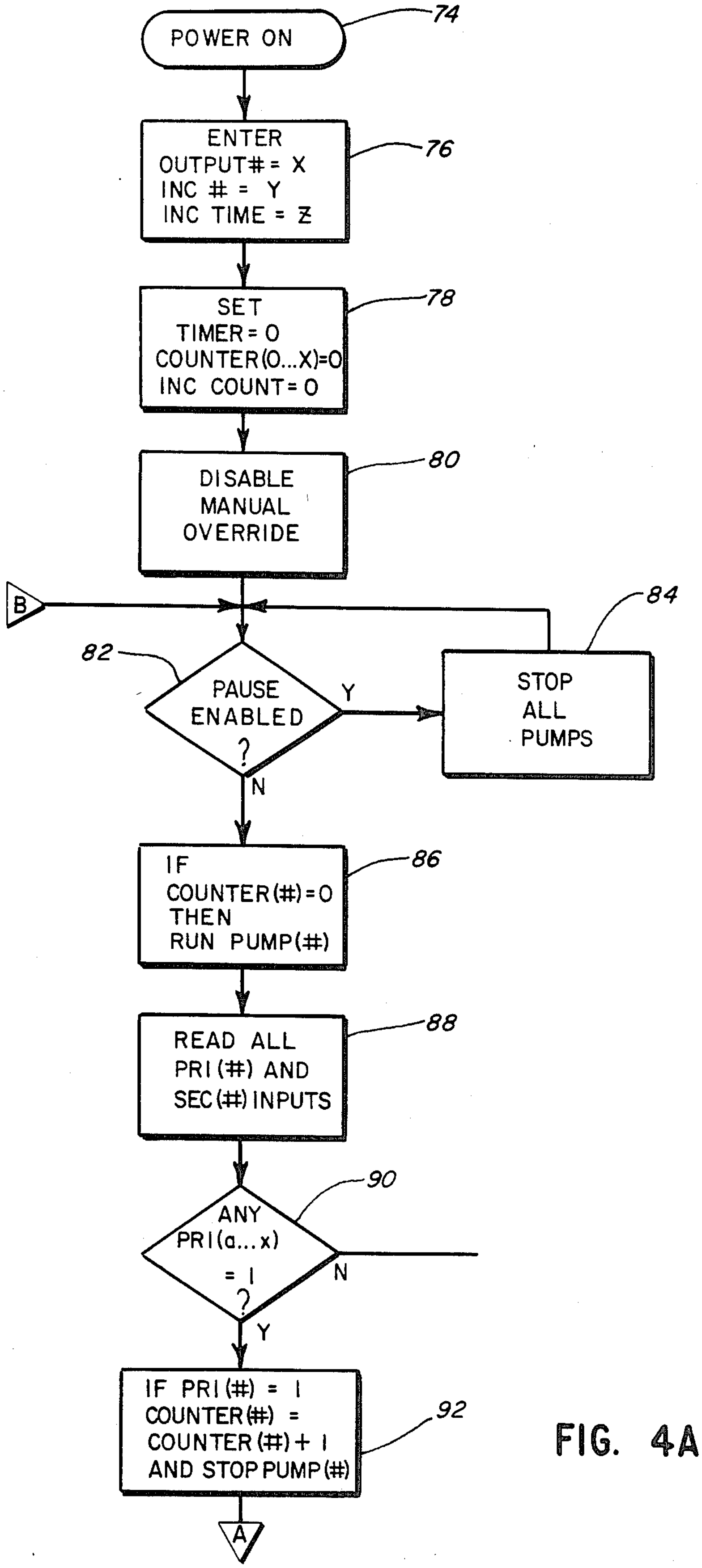
FIGS. 4A and 4B illustrate a flow diagram of the control operation performed by the master controller of FIG. 3.
Figure 4B:
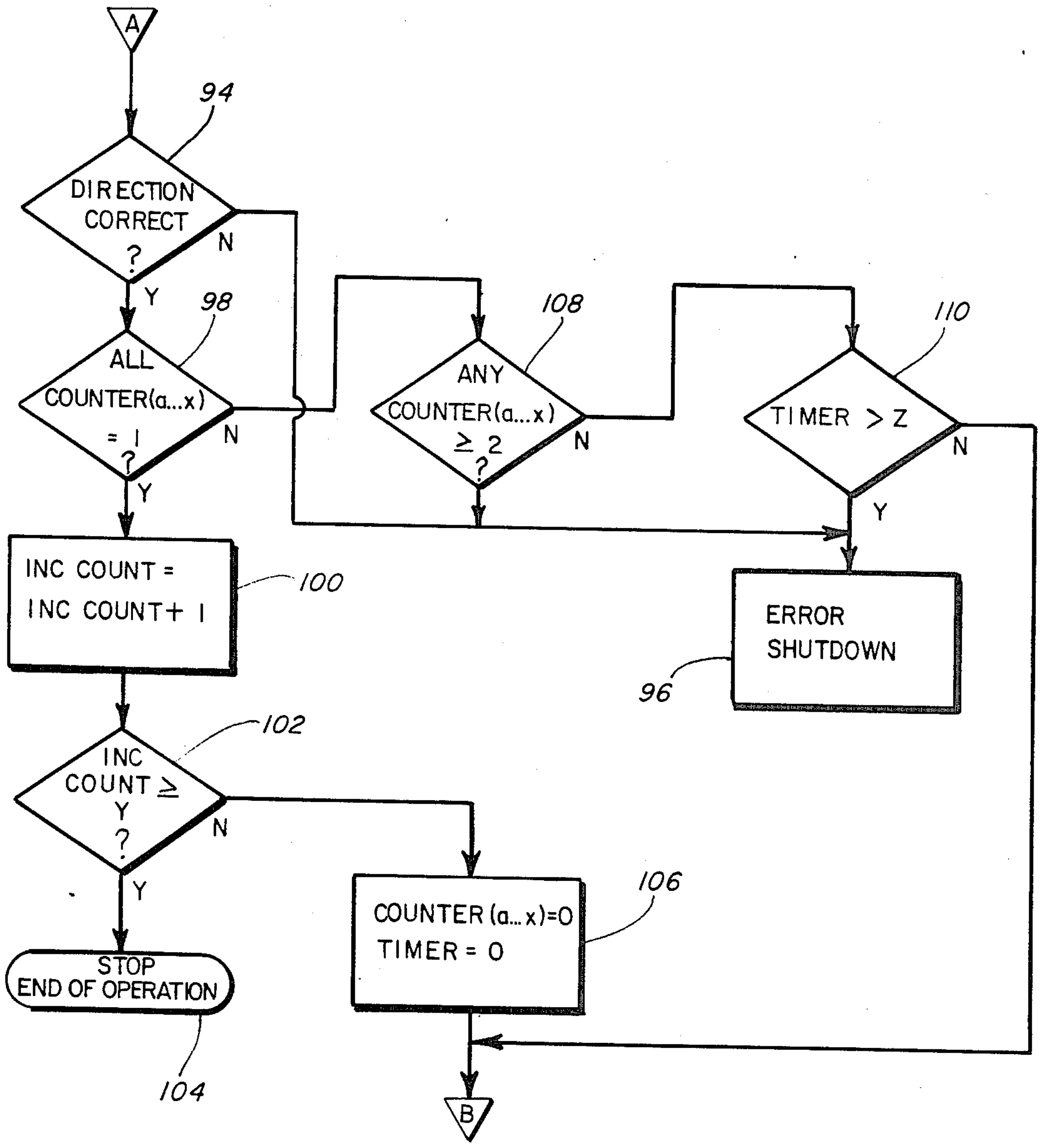

Referring also to FIGS. 4A and 4B, a flow diagram illustrates the control performed by the software in the master controller 28 to control raising or lifting the load 12. It should be noted that in the preferred embodiment, the master controller does not control directional movement of the rams 20. As described above, the direction is determined by the position of the four-way manual valves 32. However, the up-down switch 62 provides an indication to the master controller 28 as to whether up or down movement has been selected.

The master controller software is initiated with power being turned on at a block 74 comprising a conventional booting up operation of the programmable controller 54. The operator, at the start of a lifting operation, at a block 76 providing means to enter the following information using the key pad 56:

(1) the number of lift points X (OUTPUT #);
(2) the lifting or lowering range in the number Y of one-quarter inch increments (INC #); and
(3) the amount of time Z for any cylinder to be under power for making a lifting or lowering increment (INC TIME).

The time increment assures that if a given ram 20 does not have the capacity to lift, or if the ram is moving away from the load without lifting, then the system will shut down.

Subsequently, at a block 78, a TIMER register indicating the cycle time for each increment of movement is set to zero, as is an INCCOUNT register, and a COUNTER(#) register for each lift point a through X. The INCCOUNT register indicates the number of increments satisfied during a lifting or lowering operation. The COUNTER(#) register indicates the number of increments of each lift point during the current cycle. The # sign relates to the particular lift point to which the register relates. The manual control buttons 68 are overridden at a block 80, thereafter enabling automatic control.

A decision block 82 provided means to determine whether or not the pause control switch 60 has been turned on. If the pause switch 60 is turned on, then all pumps 16 are stopped at a block 84. If no pause has been enabled, then a block 86 provides means to turn on each pump 16 which has zero in its associated COUNTER(#) register. The status of all primary sensors **48*a–d* (PRI(#)) and secondary sensors 50*a–d* (SEC(#)) is read at a block 88 providing status read means. A block 90 provides means to determine whether the input signal from any of the primary sensors 48*a–x* is in the high state, indicating that a slot 38 in the sensor plate 36 is being sensed. A block 92 provides means incrementing the COUNTER(#) register for any lift point where the primary sensor has a transition to a high state output, and stops its associated pump, indicating that the lift point has achieved its lifting increment. A decision block 94 constitutes means to determine whether or not the sensed direction of movement is as selected at the switch 62. A sub program for determining the direction is described in greater detail below in connection with FIG. 5**.

If the sensed direction is incorrect, then means at block 96 registers that an error has occurred and shuts down the system by disabling all of the pumps 16. If the sensed direction is correct, as determined by means at block 94, then a block 98 providing means to determine whether or not the COUNTER(#) register for each lift point is equal to one. If all COUNTER(#) registers are equal to one, indicating that each ram 20 has elevated the load by one increment, then the INCCOUNT register is incremented by one at a block 100. A decision block 102 constitute means to determine whether or not the INCCOUNT register is greater than or equal to the operator entered increment number Y. If the increment counting register is greater than or equal to Y, indicating that the load has been lifted the required distance, the control advances to a stop block 104 having means to end the operation. If the decision block 102 determines that the lifting distance has not been achieved, then each lift point COUNTER(#) register is set to zero and the TIMER is reset to zero by means at block 106. Subsequently, control returns to decision block 82 to allow for the next increment cycle of raising of the load 12.

If the decision block 98 determines that all of the lift point COUNTER(#) registers are not equal to one, indicating that the lifting increment has not been met at each point, then a decision block 108 constitute means determining whether any COUNTER(#) register has a value greater than or equal to two. If any COUNTER(#) register has value greater than or equal to two, indicating that a lift point has been raised two or more increments within one cycle, then control advances to the error shutdown block 96 having means to terminate operation. Otherwise, a decision block 110 has means determining whether or not the TIMER register value is greater than the maximum time Z set to make each increment. If too much time has elapsed, the controller advances to the error shutdown block 96. Otherwise, the controller returns to the decision block 82 to continue the particular cycle.

Summarizing the control operation, the master controller 28 is initiated with each ram 20 at a predetermined position. The master controller 28 energizes each pump 16 simultaneously at the start of an increment cycle, and each pump 16 remains energized until the leading edge of a high state pulse is received from its associated sensor 22. Thus, the elapsed time each pump 16 is energized is dependent upon the time required for its associated ram 20 to move the distance "L" between adjacent slots 38 on the sensor plate 36. The operation continues on a cyclical basis to synchronize the raising or lowering of the load 12. Essentially, the fastest acting ram 20 waits for the remaining rams to catch up prior to completion of each cycle. Additionally, the controller counts the number of pulses received from each sensor. As long as the count for each sensor never exceeds one within a cycle, the system continues to operate. The counter for any sensor might exceed one, if, for example, a pump 16 failed to stop the raising of the ram 20 when commanded to do so by the master controller 28.

A direction sensing program for the block 94 operates to determine the direction of movement of the load by determining the sequence in which the slots 38 in the sensor plate 36 are sensed by the primary and secondary sensors 48 and 50, respectively, in any given cycle. The sequence of the pulses from the two sensors depends on the direction of movement of the load. Accordingly, the master controller analyzes the sequence of the pulses to determine whether or not the sensed direction is in accordance with the direction set with the up-down selector switch 62.

Figure 5:
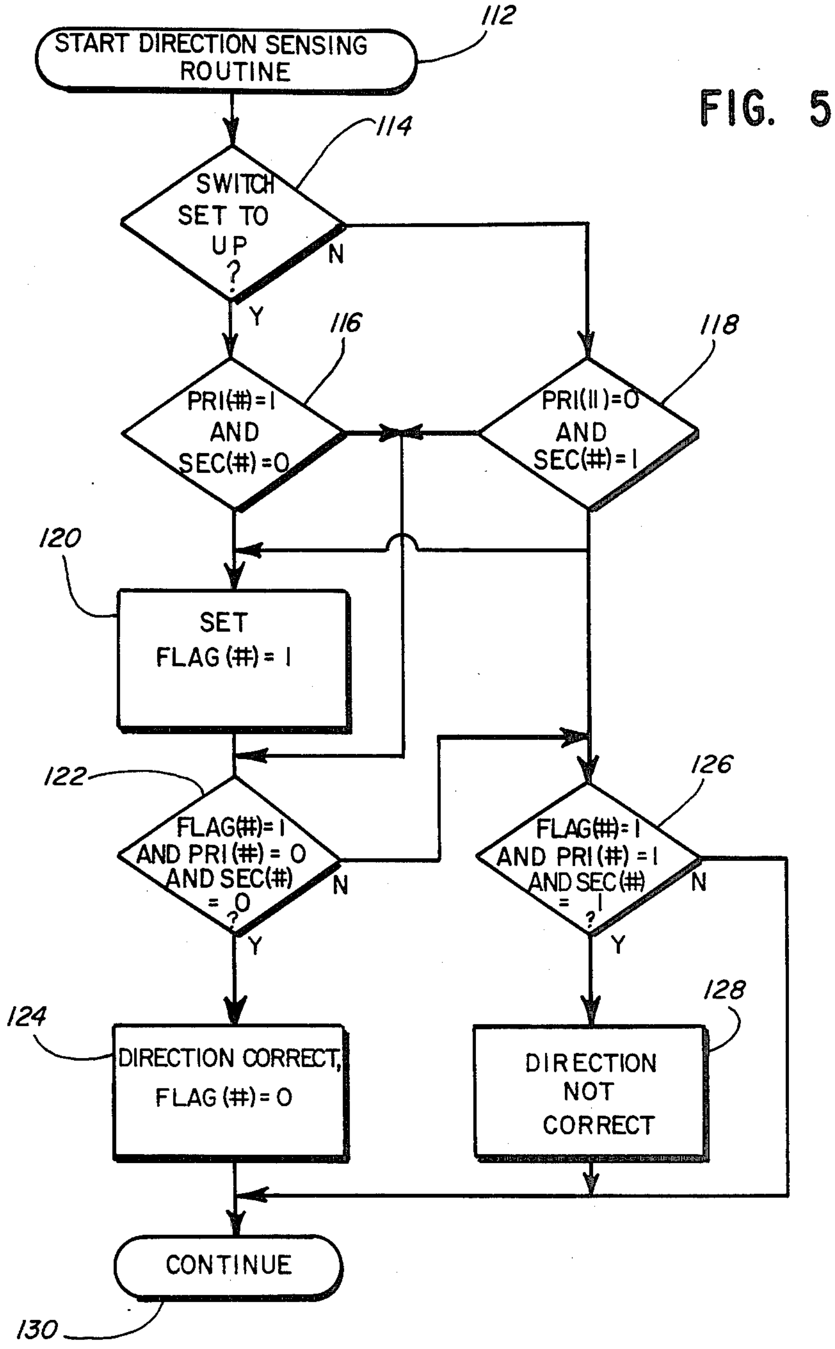
FIG. 5 is an illustration of a flow diagram of a direction sensing portion of the master controller operation.

Referring to FIG. 5, a flow diagram of the direction sensing program previously described with reference to decision block 94 of FIG. 4B, is illustrated. Control enters the direction sensing subroutine means at a block 112. A decision block 114 has means to determine whether or not the selector switch 62 is in the up position indicating that the load is to be raised. If the switch is in the up position, then a decision block 116 has means to determine whether or not the primary sensor 48 for a sensor system 22 is generating a high state signal and its associated secondary sensor 50 is generating a low state signal. If the decision block 114 determines that the switch 62 is not in the up position, then a decision block 118 constitutes means to determine whether or not the primary sensor 48 of each sensor system 22 is generating a low state signal and the associated secondary sensor 50 is generating a high state signal. If the conditions described in either decision block 116 or 118 are met, then a FLAG(#) register is set to one at a block 120. If the conditions at block 116 or 118 are not met, or after the FLAG(#) register has been set at block 120, then a decision block 122 has means to determine whether the FLAG(#) register is equal to one and both the primary and secondary sensors are both in a low state, in which case the direction is correct and the FLAG(#) is reset to zero at a block 124 having reset means. If any condition of decision block 122 is not met, then a block 126 has means to determine whether or not the FLAG(#) register has been set and both the primary and secondary sensors are in the high state, for each sensor system 22. If these conditions are met, then the direction of movement is not correct which is noted at a block 128 having direction determining means. In either event, control continues at a block 130 having means to provide an indication to the decision block 94 whether or not the direction is correct. In all cases, the direction is assumed correct initially and remains so until indicated otherwise at the block 128.

From a control standpoint, the lowering operation and raising operation are identical. The master controller 28 controls the pump 16 in accordance with signals generated by the position sensors 22, as described relative to the flow diagrams of FIGS. 4A and 4B. However, in a lowering operation, each four-way manual valve 32 must be set to reverse flow of hydraulic fluid to the load lowering valve 18 and double-acting ram 20.

In alternative embodiments, different slot spacing on position grids could be utilized where more or less accuracy is required. Additionally, the control system of the present invention could operate in conjunction with an analog-type sensor wherein sensed information is converted into incremental position information. Additionally, incremental movement of each ram in a cycle could be modified if sensors with different slot spacing are utilized at each lift point.

While the preferred embodiment described herein relates to a lift control system, the control system of the present invention has other uses where controlled movement of plural rams or other similar actuator elements is required.

Thus, the invention broadly comprehends a universal control system for simply and reliably controlling movement of a plurality of hydraulic actuator elements.

In summary, a lift system as specifically disclosed herein, can use "off-the-shelf" hydraulic pumps and double-acting rams with intermixing of differing oil delivery rates and capacities, respectively, to effect the precision control over lifting or lowering a load, such as a bridge, a building, or a huge forming die. The lift system has a group of components used to control the hydraulic pumps and rams and which will keep the load level at all points, regardless of load weight distribution. All that is required is programming into the master controller the number of lift points, the total distance for the lifting or lowering of the load with a determination of the increments of movement, and the amount of time allowed for all rams to complete an increment of movement. All rams must complete their increment of movement before the rams commence the next increment of movement. This assures the load remains level during the lifting or lowering thereof. Since all rams must complete their increment of movement before the next cycle of movement, this removes the necessity for uniform rates of increment movement of the rams. When a ram has moved a load through the increment for that ram, the pump associated therewith momentarily stops and then starts again when the slowest pump/ram combination has completed its increment of movement.

The foregoing disclosure of the preferred embodiment is illustrative of the broad inventive concepts comprehended by the invention.

The control system can directly control valves rather than pumps to achieve ram incremental movement.

We claim:

1. A control system for a plurality of individually movable hydraulic cylinders for exerting force against a member comprising, a plurality of hydraulic pumps in circuit one with each of said cylinders, control means common to all of said pumps, a plurality of sensor means associated individually one with each cylinder including a movable position grid operatively connected to the member acted upon by the cylinders and having a series of scannable slots, at least one sensor element for scanning successive slots in a position grid as the position grid moves in response to cylinder-applied force acting on the member, and said control means having means to cause incremental movement of the cylinders by initiating operation of all of said pumps and stopping operation of each pump when a slot in the associated position grid is scanned and when all pumps are stopped causing restart of the pumps until all increments of movement are completed.

2. A control system as defined in claim 1 wherein said sensor element is mounted independently of the associated cylinder to be free of error resulting from bodily movement of a cylinder into a support surface as a result of force exerted on said member.

3. A control system as defined in claim 2 including an independently-supported adjustable stand for said sensor element.

4. A control system as defined in claim 1 wherein there are a pair of spaced-apart sensor elements associated with a position grid and with their spacing being greater than the spacing between slots of the position grid, and said control means including means for receiving signals from both sensor elements and determining therefrom the direction of movement of said member and for stopping operation of the pumps if the movement is in a direction opposite to that commanded by the control means.

5. A control system as defined in claim 1 usable for lowering said member including a counterbalance valve in the circuit between a pump and a cylinder to assure a controlled lowering of the member and prevent dropping of the member if the circuit fails.

6. A control system for controlling plural incremental movements of a plurality of actuator elements, comprising:

means associated with and supported independently of an actuator element for sensing incremental movement of each actuator element; and control means coupled to said actuator elements and said sensing means for providing a selective plurality of equal and incremental movements of each of said actuator elements responsive to incremental movement sensed by said sensing means and assure an increment of movement of all actuator elements within the same time interval.

7. A lift control system operable to raise or lower a load while maintaining the load substantially level, comprising:

first and second means cooperating with the load at first and second lift positions thereon for raising the load;

first and second means for sensing the elevation of the load at the first and second lift positions, respectively; and control means coupled to said first and second raising means and said first and second sensing means for providing a selective plurality of equal and incremental movements of each of said first and second raising means responsive to the elevations sensed by said first and second sensing means, respectively, to maintain the load substantially level during a lifting operation.

8. The lift control system of claim 7 wherein each said raising means comprises a hydraulic ram.

9. The lift control system of claim 7 wherein each said raising means comprises a hydraulic pump and a hydraulic ram and wherein pump operation is controlled by the control means.

10. The lift control system of claim 7 wherein each said sensing means generates a pulse signal with each pulse representing an increment of movement of the load.

11. The lift control system of claim 7 wherein each said sensing means comprises a photoelectric sensor and an elongate sensor plate having a plurality of spaced slots therethrough, said sensor plate being connected to the load for movement therewith, wherein said sensor generates a pulse signal representative of the presence of a slot adjacent said sensor.

12. The lift control system of claim 7 wherein said control means comprises a programmable control device including means for entering a quantity of equal and incremental movements to be implemented by said raising means in a lifting operation, representing a distance which the load is to be raised.

13. The lift control system of claim 7 wherein said control means operates each raising means independently in a cyclical operation to raise the load wherein in each cycle each of said first and second raising means raises the load a preselected distance measured by said first and second sensing means, respectively.

14. A lift control system operable to selectively raise or lower a load while maintaining the load substantially level relative to a reference level, comprising:

a plurality of double-acting rams for engaging the load at a plurality of different lift positions to controlably raise or lower the load;

a plurality of hydraulic pumps, one for each ram;

means for hydraulically coupling each pump to one of said rams;

a plurality of sensing means one at each lift position for sensing the elevation of the load at each of said lift positions; and control means coupled to said pumps and to said sensing means for commanding operation of said pumps to provide a selective plurality of equal and incremental movements of each of said ram, and thus said load, responsive to the elevation sensed by said sensing means to maintain the load substantially level relative to the reference during a raising or lowering operation.

15. The lift control system of claim 14 wherein each said sensing means comprises an infra-red sensor and a position grid having a plurality of spaced slots therethrough, said position grid being connected to the load for movement therewith, wherein said sensor generates a pulse signal having pulses representative of the presence of a slot at said sensor.

16. The lift control system of claim 14 further comprising means for sensing the direction of movement of the load.

17. The lift control system of claim 16 wherein said direction sensing means comprises a second infra-red sensor offset from said other infra-red sensor a distance greater than the spacing between said slots.

18. The lift control system of claim 17 wherein a sequence of pulses generated by each said sensor indicates direction of movement of the load.

19. A method of lifting a load while maintaining the load substantially level relative to a reference, comprising the steps of:

engaging the load at a plurality of lifting points with a plurality of controllable lifting devices;

automatically operating each lifting device until each lifting device raises the load a preselected incremental distance;

waiting a preselected maximum amount of time for each lifting element to raise the load said preselected increment;

automatically repeating the controlled incremental movement of the lifting devices until the load has been raised a preselected distance.

20. The method of claim 19 further comprising the steps of sensing the direction of movement of the load.

21. The method of claim 19 further comprising the steps of automatically lowering the load comprising preselected incremental movement of the load similar to that for raising the load.

22. A method for exerting successive increments of force on a member at spaced locations comprising the steps of:

engaging the member at spaced locations with a plurality of double-acting hydraulic rams;

simultaneously starting a plurality of pumps hydraulically coupled to said double-acting rams for simultaneously extending the ram pistons;

sensing incremental movement of the member at the position of each ram;

stopping each pump when a ram has achieved a preselected amount of incremental movement;

waiting for each ram to complete the preselected increment of movement; and automatically operating the pumps on a cyclical basis to repeat the incremental movement of each ram after all rams have completed an increment of movement.

23. The method of lifting/lowering a load, such as a bridge, a building, or other structure by use of standard hydraulic pumps and double-acting rams comprising, determining the number of lift points, each requiring a hydraulic pump and a ram, determining the increments of movement of the ram to accomplish total movement of the load, programming into a master controller the determination of lift points and the number of increments of movement of the same as well as the allotted time for each ram to complete an increment of movement, selecting a position grid provided with a spacing of slots corresponding to an increment of movement, flexibly suspending a position grid from the load adjacent each lift point, operating all of said pumps to cause movement of all of said rams, stopping each pump as its associated ram completes an increment of movement, and restarting all of said pumps after the associated rams have all completed the preceding increment of movement.

* * * * *